United States Patent Office 3,207,229
Patented Sept. 21, 1965

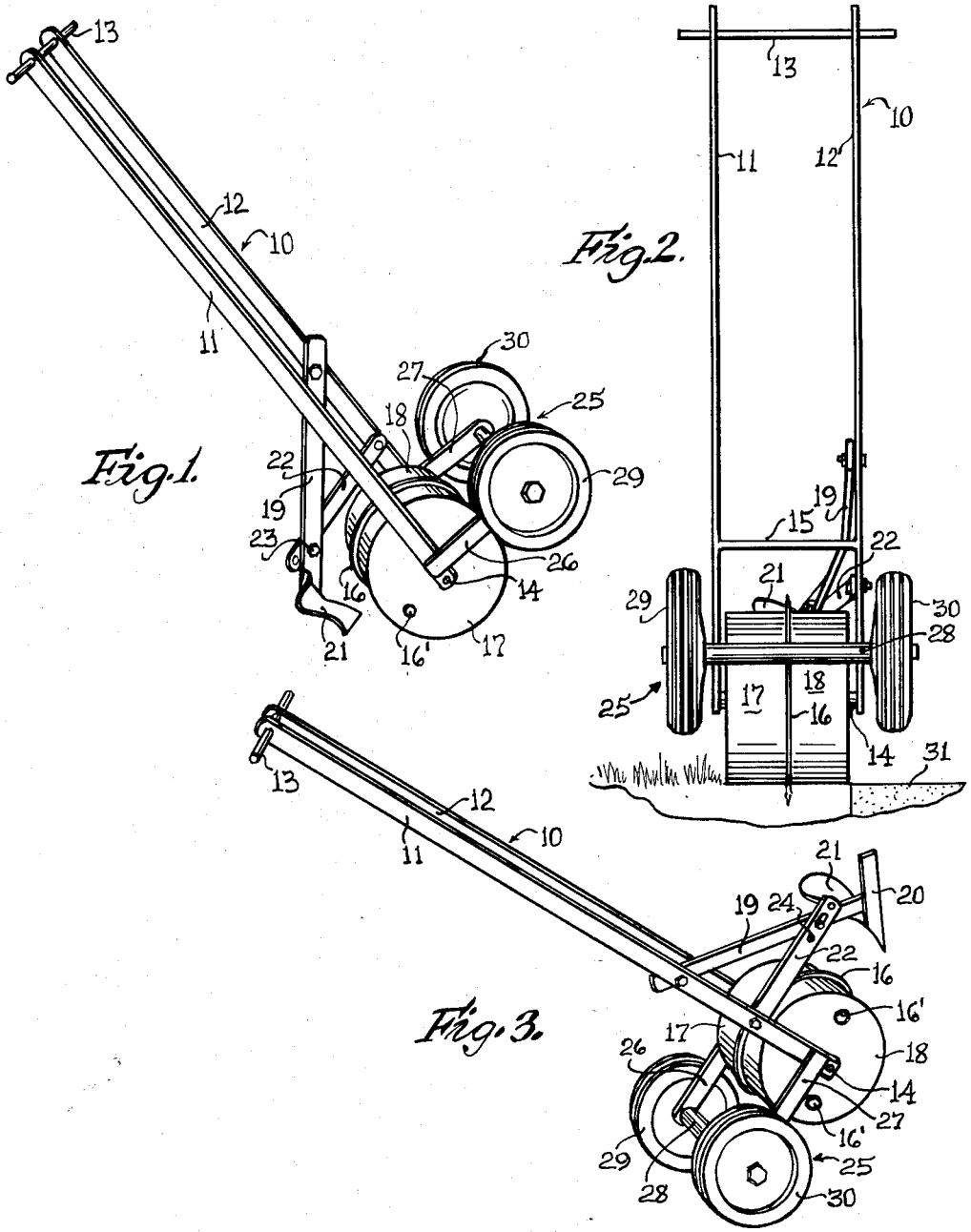

3,207,229
LAWN EDGER
Permil N. Nelson, Galesburg, Ill., assignor to Lynn H. Ewing, doing business as Blackhawk Company, Rock Island, Ill.
Filed Aug. 25, 1964, Ser. No. 391,880
1 Claim. (Cl. 172—16)

My invention relates to a new and useful improvement in a lawn edger and more particularly to an apparatus which will edge a lawn by cutting and removing a specific amount of grass adjacent to the edge thereof.

A principal object of my invention is to provide in a lawn edger of this character, a circular cutter blade fixed to and rotatable with a suitable weight whereby the blade can be progressively moved through a desired cutting path at a pre-determined depth.

Another object of my invention is in the provision in an apparatus of this character of a means for facilitating the removal of the cut or unwanted edge portion of the lawn being edged.

A further object of my invention is in the provision in an apparatus of this character of an arrangement of parts which accomplish the progressive steps of first separating by cutting an edge portion of a lawn or the like with the cut being of a pre-determined amount and to a desired depth, and secondly, removing the cut edge portion through a plow-like attachment disposed and arranged in a pre-selected position with respect to the cutter.

Yet another object of my invention is to provide in a lawn edger of this character a means whereby the same may be readily transported without damage to the cutting blade and plow attachment thereof.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved lawn edger in its operative condition.

FIG. 2 is a front elevational view of my improved lawn edger in its operative position, and FIG. 3 is a perspective view showing my improved lawn edger in its portable condition.

In my improved lawn edger, I provide a frame 10 which comprises a pair of spaced apart parallelly extending support members 11 and 12. One free end of each of the support members 11 and 12 is connected together by a handle 13 while the opposite ends of the support means 11 and 12 are joined together by a shaft 14. A brace 15 extends between the supporting members 11 and 12 intermediate the ends thereof, as seen in FIG. 2.

Journaled upon the shaft 14 is a circular cutter blade 16. Also journaled on the shaft 14 to either side of the blade 16 and between the corresponding ends of the support members 11 and 12 are identical circular weighted rollers 17 and 18. These circular weighted rollers 17 and 18 are fixedly connected to the circular blade 16 by bolts 16' so as to make an integral wheel-like structure.

As shown in the drawings, the circular cutter blade 16 has a diameter slightly greater than the diameter of the circular rollers 17 and 18 so that the tapered cutting edge of the blade 16 extends radially therebeyond a predetermined distance.

Pivotally mounted on the support member 12 adjacent the brace 15 is a leg 19 which terminates into a cross arm 20 (see FIG. 3). Fixedly attached to the cross arm 20 and the leg 19 is a plowhead 21. As seen in the drawings and particularly in FIG. 2, the plowhead 21 is adapted to lie in a common plane with respect to the peripheral edge of the cutter blade 16. This for a purpose hereinafter explained. Also mounted on the support member 12 is an adjusting bar 22 which by a nut and bolt connection 23 is connected to the leg 19. The adjusting bar 22 has its free end provided with a series of apertures 24 through which the nut and bolt connection 23 may be positioned to vary the position of the plowhead 21 with respect to the cutter blade 16.

For the purpose of transporting the lawn edger without damage to the cutting blade 16 and plowhead 21, I have provided a wheeled carriage 25 which comprises a pair of struts 26 and 27 each having their corresponding ends connected to the supporting members 11 and 12 respectively.

The free ends of the struts 26 and 27 rotatably receive a shaft 28 upon which is rotatably journaled wheel members 29 and 30. As shown in the drawings, the wheel carriage 25 is positioned to the opposite side of the supporting members 11 and 12 as is the plowhead 21 and its associated supporting parts. Thus when the lawn edger is transported, all that need be done is to flip the same onto its back onto the wheels 29 and 30.

As shown in FIG. 2, the operation of the lawn edger is most efficient when the circular weighted roller 18 is caused to lie adjacent the edge of the sidewalk 31 or the like. This will dispose the cutter blade 16 inwardly thereof a desired distance which is preferably 2″ to 3″. The effective weight of the rollers 17 and 18 will normally cause the peripheral edge of the cutter blade 16 to penetrate the ground to a depth equal to its exposed portion, which is preferably 1″ to 2″.

As the lawn edger is manually propelled, the cutter blade 16 will sever that portion of the lawn between the sidewalk edge and the blade from the remaining portion of the lawn. By further propelling the lawn edger, the plowhead 21 may be forced into the severed portion of the lawn edge and by reason of its curvature will displace the severed edge portion of the lawn on to the top surface of the sidewalk 31 from which it can readily be removed.

The amount of displacement of the severed lawn edge can be determined by adjusting the position of the plowhead 21 with respect to the forward portion of the lawn edger through the connection of the adjusting bar 22 with the leg 19.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A lawn edger comprising
 (a) a handle structure including a pair of spaced apart normally inclined support members,
 (b) a shaft journalled between corresponding ends of said support members and adapted to carry a cutting element,
 (c) a circular cutting blade having a tapered peripheral cutting edge rotatably mounted on said shaft between the corresponding ends of said support members,
 (d) ground engaging rollers mounted on said shaft to either side of said cutting blade and fixedly connected thereto for rotation about said shaft,
 (e) said roller having a diameter less than the diameter of said cutting blade so as to expose said tapered peripheral cutting edge beyond the periphery of said rollers, (f) said rollers being of a sufficient size and weight to position said cutting edge a selected distance from the edge of the lawn to be trimmed and to effect penetration of said tapered cutting edge into the ground a pre-determined depth, (g) a plowhead carried by one of said support members to the rear of and in horizontal alignment with said cutting blade for displacing the severed edge portion of the lawn out of its normal site, and (h) support mean adjustably mounting said plowhead directly on said one of said support members, (i) said support means comprising a leg pivotally mounted on said one of said support members and an adjusting bar pivotally mounted on said one of said support members and adjustably connected to said leg, (j) said plowhead being rigidly mounted on said leg and adjustably movable therewith to selected positions relative to said circular cutting blade and said ground engaging rollers to determine the amount of severed lawn to be laterally disposed thereby.

References Cited by the Examiner

UNITED STATES PATENTS

| | | | |
|---|---|---|---|
| 487,058 | 12/92 | Pullar | 172—16 |
| 1,222,031 | 4/17 | Rial | 172—241 X |
| 1,523,797 | 1/25 | Bauer | 172—16 |
| 1,796,606 | 3/31 | McBride et al. | 172—15 X |
| 2,032,467 | 3/36 | Burke | 172—16 |
| 2,075,301 | 3/37 | Pipenhagen | 172—15 X |
| 2,476,461 | 7/49 | Smith | 172—16 |

FOREIGN PATENTS 532,509  1/41  Great Britain.

ABRAHAM G. STONE, *Primary Examiner.*